INVENTOR.
ANGUS H. CUDDON-FLETCHER

INVENTOR.
ANGUS H. CUDDON-FLETCHER

United States Patent Office 3,515,035
Patented June 2, 1970

3,515,035
PISTON PIN LUBRICATION
Angus H. Cuddon-Fletcher, Oshkosh, Wis., assignor to Brunswick Corporation, Chicago, Ill., a corporation of Delaware
Filed July 5, 1968, Ser. No. 742,829
Int. Cl. F01b *31/10;* F16n *1/00;* F01m *11/00*
U.S. Cl. 92—159                           4 Claims

ABSTRACT OF THE DISCLOSURE

A floating wrist pin is lubricated by suitable holes forcing oil downwardly to the wrist pin bore at an appropriate angle from the point of maximum bearing load from individual pick-up pockets preferably just beneath the lower piston ring.

---

The present invention relates to a construction for lubricating a floating type of wrist pin in its bearings in a piston.

The invention may be employed in any internal combustion engine wherein the wrist pin moves relative to the piston and it has been applied specifically to the lubrication of such a wrist pin for a two-cycle internal combustion engine having crankcase fuel feed wherein the lubricating oil is mixed with the fuel and crankcase compression effects transfer of the fuel to the cylinder through one or more transfer passages.

Heretofore, attempts to lubricate wrist pin bearings have employed annular grooves around the piston and which are supposed to pick up lubricant from the surface of the cylinder walls and direct the same through openings to the wrist pin bearings. It is this general type of lubrication that is very substantially improved by the present invention.

For instance, with the annular groove extending circumferentially of the piston it is found that the groove passes over the transfer and exhaust ports in the wall of the cylinder and may have an adverse effect upon the crankcase compression and upon the lubrication.

According to the present invention lubricant is picked up from the surface of the cylinder only in longitudinal regions of limited circumferential extent so that the individual pick-up pockets do not connect with the transfer or exhaust ports at any time in the reciprocation of the piston.

Furthermore, the slant of the hole leading from the pocket to the wrist pin bearing and the ideal location for it to discharge oil onto the wrist pin have been found to be important in maintaining a desired continuous lubrication of the wrist pin, particularly when considering the fact that a floating wrist pin may oscillate but a small amount in the bearing bores of the piston or may rotate in either direction or may oscillate in very short increments.

The accompanying drawing illustrates the best mode presently contemplated by the inventor for carrying out the invention.

The piston 1 is of the usual type with three piston rings 2 lying in corresponding circumferential grooves in the piston.

Figures 3, 4:
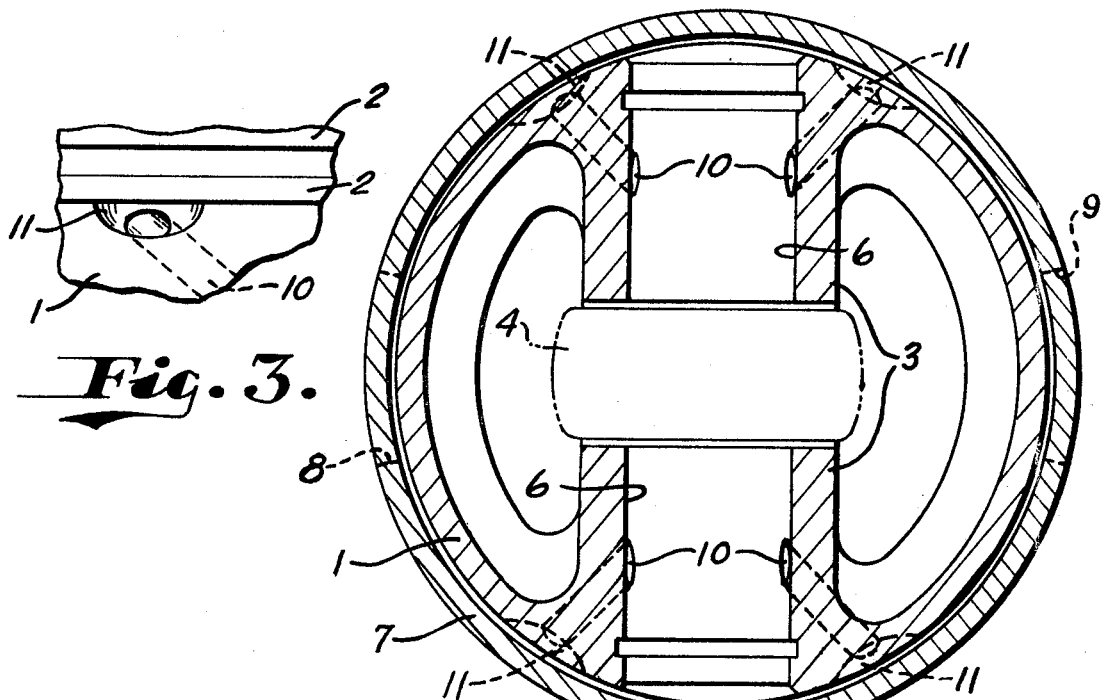
FIG. 3 is an enlarged front elevation of a pocket.
FIG. 4 is a transverse horizontal section taken on line 4—4 of FIG. 1 axially of the wrist pin bore and looking upwardly therefrom with a schematic illustration of the cylinder walls.
Figure 5:
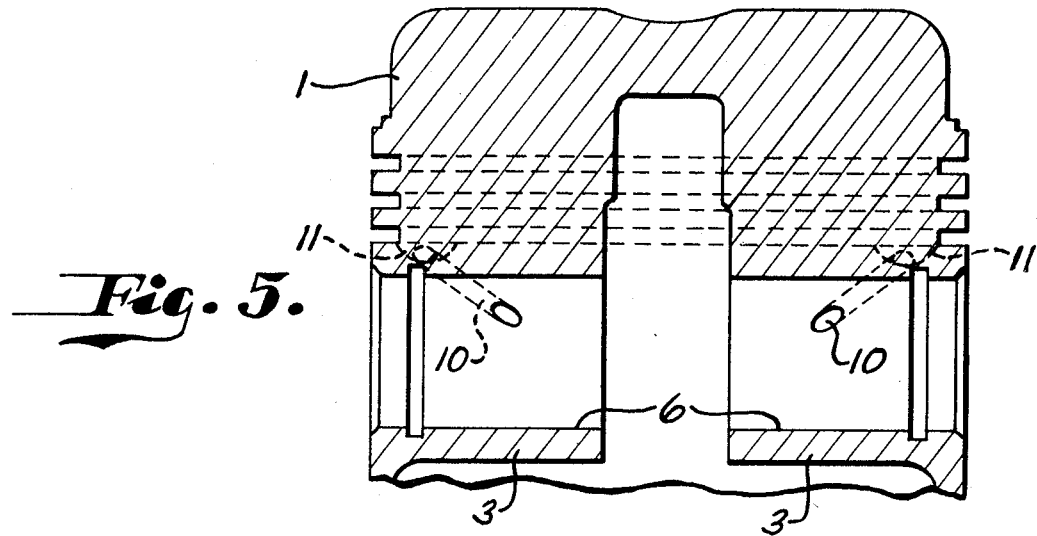
FIG. 5 is a vertical section taken on line 5—5 of FIG. 1 axially of the wrist pin bore.

The piston 1 is hollow and has two aligned bearing bosses 3 projecting inwardly thereof on opposite sides of the connecting rod upper bearing 4 shown schematically in FIG. 4.

A wrist pin 5 extends through bearing 4 with its opposite ends floating in bearing bores 6 in the corresponding bosses 3.

Figures 1, 2:
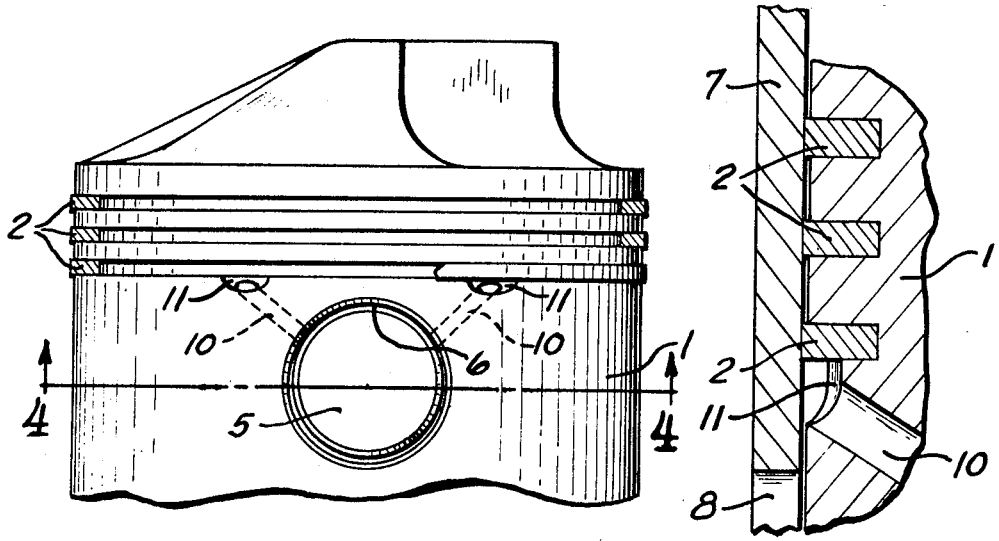
FIG. 1 is a side elevation of a piston looking axially of the wrist pin bore.
FIG. 2 is an enlarged detail section showing a pocket with a piston ring functioning therewith as related to the cylinder wall.

As shown in FIGS. 2 and 4 the piston 1 reciprocates in a cylinder 7 having the usual transfer ports 8 and exhaust ports 9 on opposite sides of the cylinder and which are uncovered by the piston during its stroke.

In carrying out the present invention each bore 6 has two lubricating ducts or passages 10 leading thereto from corresponding pockets 11 in the outer wall of the piston above the bore and on opposite sides thereof.

As shown in detail in FIGS. 2 and 3 each pocket 11 constitutes a recess in the outer surface of the piston 1 just beneath the lower piston ring 2 and from the bottom of which the hole or passage 10 extends at a slant inwardly and downwardly of the piston toward the corresponding bore 6.

The inner end of passage 10 opens into the bore 6 at a location generally midway of the length of the bearing portion of the bore and preferably between about 40 and 60° from the top or point of maximum load for the wrist pin. The importance of this is indicated in the enlarged view of FIG. 6 wherein the flow of lubricant is shown for a given rotational direction of the wrist pin.

Figure 6:
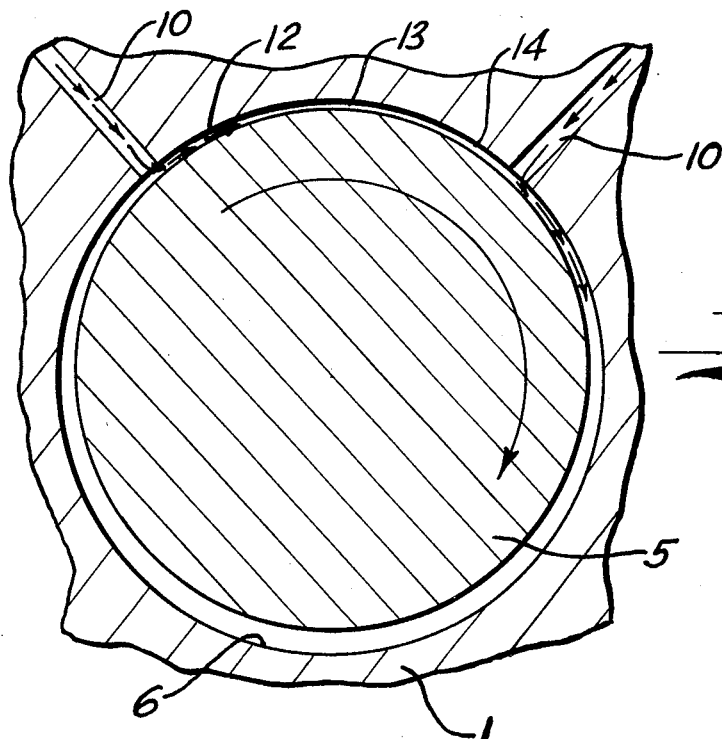
FIG. 6 is an enlarged detail transverse section through the wrist pin and bore at the discharge location for the lubricant ducts and showing the wedging effect utilized for lubrication of the wrist pin.

Referring to FIG. 6, on the downstroke of the piston when the wrist pin 5 rotates clockwise in the direction of the arrow, lubricant entering through the upper left hand passage 10 tends to move up to form the oil wedge 12 between the pin 5 and the bore 6 and toward the top 13 of the pin where the load is at a maximum resulting in maximum pressure between the pin and bore. Lubricant entering bore 6 from the upper right hand passage 10 flows downwardly as indicated by the arrows in the general direction of rotation of pin 5 and into the region of maximum clearance between the pin 5 and bore 6.

Should the wrist pin 5 rotate in the opposite direction, the lubricant from the upper right hand passage 10 moves upwardly to form the oil wedge 14 toward the point 13 of maximum load, and the lubricant from the upper left hand passage 10 flows downwardly into the region of maximum clearance.

By maintaining the bottom edge of the pocket 11 sharp any lubricant collected therein will tend to flow into the corresponding passage 10 on the upstroke of the piston due to the inertia force of the oil. On the downstroke the lower piston ring 2 will scrape a quantity of oil into the pocket 11.

The invention thus provides an adequate continuous supply of lubricant to the wrist pin at all times.

The pockets 11 are disposed near to the ends of the wrist pin and thus reciprocate in a region generally circumferentially spaced from the region of the transfer ports 8 and exhaust ports 9.

Various modes of carrying out the invention are contemplated as being within the scope of the following claims particularly pointing out and distinctly claiming the subject matter which is regarded as the invention.

I claim:

1. In an internal combustion engine having a cylinder with transfer and exhaust ports in the sides thereof, a piston reciprocal in the cylinder and carried by a wrist pin at the upper end of a connecting rod, said piston having at least one piston ring and internal aligned bosses with bearing bores receiving the opposite ends of the wrist pin, and means for lubricating said wrist pin in said bores comprising at least one pocket having therein at least one lubricant passage for each boss extending downwardly at a slant from a position just beneath the lower most piston ring to the bore of said boss at a position down from the top load point therefor, said pocket being circumferentially spaced from the region of the transfer and exhaust ports.

2. The construction of claim 1 and wherein each said pocket has a sharp lower edge to direct a maximum of lubricant scraped from the wall of the cylinder into the passage and to said bore.

3. The construction of claim 1 having a lubricant passage on each side of each boss and opening into the bore of the corresponding boss at a position spaced approximately from about 40° to 60° from the top point of maximum load for the wrist pin to provide a wedge feed of lubricant upwardly on the wrist pin from either passage depending upon the direction of rotation of the wrist pin.

4. The construction of claim 1 in which each said passage discharges into the bore of the corresponding boss at a position approximately 60° circumferentially from the top load point therefor.

References Cited

UNITED STATES PATENTS

| 2,108,194 | 2/1938 | Church | 92—160 |
| 2,200,015 | 5/1940 | Alexandrescu | 92—158 XR |
| 2,702,219 | 2/1955 | Sintz et al. | 92—160 |

MANUEL A. ANTONAKAS, Primary Examiner

U.S. Cl. X.R.

92—160